C. B. Parsons,
Converting Motion.

N° 27,307. Patented Feb. 28, 1860.

Witnesses:
C. M. Alexander
A. H. Geatman

Inventor:
C B Parsons

UNITED STATES PATENT OFFICE.

CHARLES B. PARSONS, OF BURR OAK, MICHIGAN.

CONVERTING RECIPROCATING INTO ROTARY MOTION.

Specification of Letters Patent No. 27,307, dated February 28, 1860.

*To all whom it may concern:*

Be it known that I, CHARLES B. PARSONS, of Burr Oak, in the county of St. Joseph and State of Michigan, have invented certain new and useful Improvements in the Mode of Converting Reciprocating into Rotary Motion; and I do hereby declare that the following is a full, clear, and exact description of the same, reference being had to the accompanying drawings and to the letters of reference marked thereon.

The nature of my invention consists in the employment of an endless rack, provided with grooves on its side when used in connection with a gear wheel, provided with an eccentric flange, on its side, substantially as hereinafter set forth.

Figure 3:
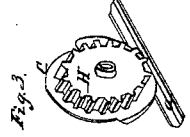
Figure 4:
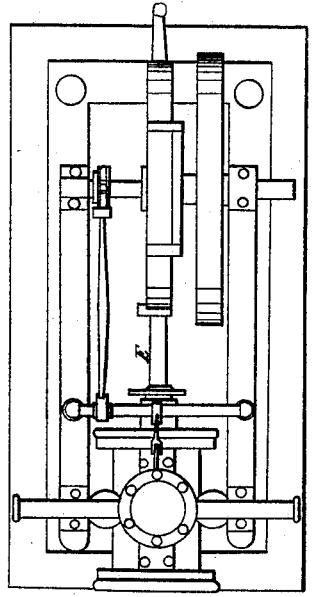
Figure 2:
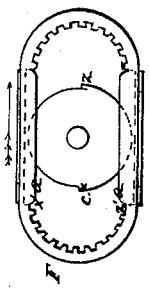
Figure 1:
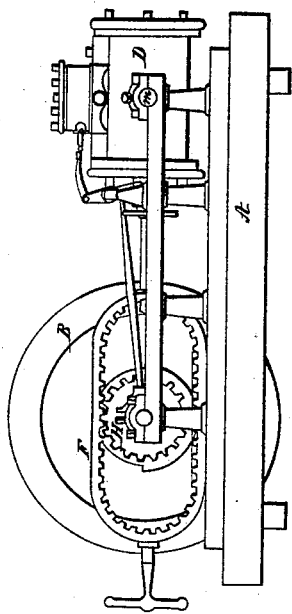

In the drawings, Figure 1 represents a side elevation. Figs. 2 and 3, are detached views of the rack and gear wheel. Fig. 4, is a plan view.

In the figures, it will be seen that in connection with those parts which are claimed as constituting the invention in this case, a steam cylinder is shown in order to represent more fully the nature and operation of the invention.

A, represents a platform upon which the engine is built.

D, represents a steam cylinder which oscillates upon its trunnions $m$, which trunnions rest in suitable bearings provided for them.

E, represents the piston rod—to one end of said rod the ordinary piston is attached which plays in the cylinder D, while the other end is attached to the endless rack F.

F, represents an endless rack which is in the form shown in the figures. The bar forming this rack is in an oblong shape, its two sides being parallel and where these sides join, or from where they converge from a straight line to join they form the half arc of a true circle.

H, represents a gear wheel which is intended to run in this rack. The diameter of the wheel is of course shorter than the distance between the parallel sides of the rack. The wheel H, is intended to run around and around in this rack. The rack bar is provided on one side with two grooves—one on each of the parallel sides as is seen at $a$, $a$. The wheel H, is provided on one face with a plate which extends beyond the teeth on the gear wheel, its rim forming an eccentric flange above the teeth or cogs on the said wheel on one side or half around the wheel. Around the other half of the wheel the rim of the plate extends only up to the top of the cogs or teeth. That portion of the flange which extends above the cogs on the wheel having a radius equal to half the distance between the two grooves $a$, $a$, it serves, so long as it is between these grooves, to keep the wheel H, in proper gear with one or the other of the sides of the rack F.

Supposing the rack and the gear wheel to stand in the position seen in Fig. 2, if we move the rack in the direction of the arrow, the corner of the flange at $x$, will pass up toward $x'$, and strike outside of the groove $a$, at that point, the corner $z$, will at the same time pass down to $z'$. As soon as the corner $z$ passes out of the groove at $z'$, the corner $x'$, enters the upper groove and causes the teeth of the wheel H to move from the upper side of the rack, around the arc, and catch regularly into the lower side of the rack, and thus it is at each end of the rack, one corner of the flange running out of the groove while the other runs into it, the wheel H, is made to traverse the rack around and around, thus converting reciprocating into rotary motion. By this arrangement I obtain an even steady motion as it will be readily seen that the power is always applied at one point to the periphery of the wheel H.

Having thus fully described my invention what I claim as new and desire to secure by Letters Patent is—

Not the endless rack F, nor the wheel H, but the combination of the grooves $a$, $a$, upon the sides of the rack F, with the eccentric flange $c$, at the side of the wheel H, when the two are constructed and arranged in the particular manner herein specified and for the purpose set forth.

CHAS. B. PARSONS.

Witnesses:
 ELLIOTT H. CRANE,
 A. F. SCHMIDT.